United States Patent [19]
Krull et al.

[11] Patent Number: 5,603,753
[45] Date of Patent: Feb. 18, 1997

[54] FILTER DEVICE HAVING ELONGATE ABSORBER PARTICLES FIXED TO A FLAT CARRIER

[75] Inventors: Manfred Krull, Eckersdorf; Gerald Rosenberg, Höchstädt, both of Germany

[73] Assignee: Helsa-Werke Helmut Sandler GmbH & Co. KG, Gefrees, Germany

[21] Appl. No.: 524,370

[22] Filed: Sep. 6, 1995

[30] Foreign Application Priority Data

Sep. 10, 1994 [DE] Germany .......................... 44 32 339.5

[51] Int. Cl.⁶ ............................................. B01D 53/04
[52] U.S. Cl. ............................ 96/121; 55/278; 96/154
[58] Field of Search .............................. 55/278; 96/121, 96/129, 149, 154

[56] References Cited

U.S. PATENT DOCUMENTS

| | | | |
|---|---|---|---|
| 2,038,071 | 4/1936 | Wilhelm | 55/278 |
| 2,973,828 | 3/1961 | Engle | 55/278 |
| 3,441,381 | 4/1969 | Keith et al. | 55/278 |
| 3,441,382 | 4/1969 | Keith et al. | 55/278 |
| 3,651,659 | 3/1972 | Nakao et al. | 55/314 |
| 3,702,049 | 11/1972 | Morris, Jr. | 55/278 |
| 3,713,281 | 1/1973 | Asker et al. | 96/154 |
| 3,925,021 | 12/1975 | Yoshino et al. | 96/118 |
| 4,234,326 | 11/1980 | Bailey et al. | 55/278 |

FOREIGN PATENT DOCUMENTS

| | | | |
|---|---|---|---|
| 0045516 | 2/1982 | European Pat. Off. . | |
| 0383236 | 8/1990 | European Pat. Off. . | |
| 2406243 | 8/1975 | Germany . | |
| 2512659 | 5/1976 | Germany . | |
| 2746977 | 4/1978 | Germany | 96/121 |
| 2941094 | 11/1980 | Germany . | |
| 4039951 | 6/1992 | Germany . | |
| 9216049 U | 1/1993 | Germany . | |
| 4339025 | 6/1994 | Germany . | |
| 54-46185 | 4/1949 | Japan | 96/121 |
| 54-8020 | 4/1979 | Japan | 55/278 |
| 60-61022 | 4/1985 | Japan | 96/154 |
| 1026591 | 4/1966 | United Kingdom . | |

*Primary Examiner*—Robert Davis
*Attorney, Agent, or Firm*—Hoffmann & Baron

[57] ABSTRACT

A filter device includes a housing having an inlet for a gaseous medium to be filtered and an outlet for the filtered medium. Disposed in the housing is a flat carrier providing a plurality of mutually adjacent layers forming a stack. The layers are so arranged in the housing that they extend in the direction of flow of the medium from the inlet through the housing to the outlet. Adsorber particles of elongate configuration are fixed on the layers and oriented at least approximately in the direction of flow of the medium through the housing.

8 Claims, 2 Drawing Sheets

FILTER DEVICE HAVING ELONGATE ABSORBER PARTICLES FIXED TO A FLAT CARRIER

BACKGROUND OF THE INVENTION

One form of filter device comprises a flat or areal carrier to which adsorber particles are fixed. The carrier forms a plurality of mutually adjacent layers which are fixed in a filter housing having an inlet for a gaseous medium to be filtered and an outlet for the filtered gaseous medium. The layers of the carrier are so arranged in relation to the inlet and the outlet of the filter housing that the gaseous medium to be filtered does not pass through or penetrate the layers but only flows along them and along the adsorber particles thereon. The layers are of a flat configuration and are assembled to constitute a rectangular parallelepipedic stack in the filter housing.

A filter device of generally similar kind is to be found in DE 40 39 951 A1 which refers to adsorber particles in the form of small cylinders which however are disposed in loose-fill form in the filter. In connection with loose-fill filters of that configuration, with adsorber particles in the form of small cylinders, it is stated therein that they cause the through-flow resistance, that is to say the resistance to the flow of gaseous medium through the filter, to become excessively high, if they are less than a given minimum size. Accordingly, that filter device preferably uses adsorber particles of spherical shape which are suitably fixed to a carrier.

U.S. Pat. No. 3,925,021 discloses a filter device in which carrier layers are connected to form a generally rectangular parallelepipedic stack by means of a plastic material forming at least a part of the filter housing.

A filter device with a flexible frame structure is to be found in DE 92 16 049 U1. That filter device is in particular an air filter for internal combustion engines, that is to say it is a particle filter and not an adsorber filter with absorber particles operative by virtue of an adsorption action.

EP 0 383 236 B1 discloses a filter device having a flat carrier folded in a zig-zag configuration. The carrier is gas-permeable because a gaseous medium to be filtered by the device has to pass through the carrier. Therefore, in order that the flow resistance through the filter device remains within suitable limits, it is necessary for the fold spacing between adjacent layers of the carrier not to be too small.

A filter device with a flat carrier which is folded in a zig-zag configuration is also to be found for example in German laid-open application (DE-OS) No 29 41 094. In this case also the carrier must comprise a gas-permeable material because the gaseous medium to be filtered passes through the carrier. The same consideration applies in regard to filter devices as are to be found for example in U.S. Pat. No. 3,651,659 or German laid-open application (DE-OS) No 25 12 659.

A filter device with a flat carrier comprising a gas-permeable material is also known for example from German laid-open application (DE-OS) No 24 06 243. In order to achieve the required level of stability in respect of shape in the case of that filter device, the carrier thereof is combined with a flat stabilization system.

EP0 045 516 B1 discloses a filter device with a flat carrier which can be folded together in a zig-zag configuration to form carrier layers, or in which the carrier is wound on to a gas-permeable tubular bar or mandrel in order to provide carrier layers in the manner of a spiral coil or winding. This arrangement however also involves a given minimum flow resistance in relation to the gaseous medium to be filtered because it is required to flow through the carrier which is folded in a zig-zag configuration or wound as a spiral coil. When such a filter device is used for example in combination with a fan assembly, that not inconsiderable flow resistance gives rise to the need for a corresponding level of drive power. That given minimum fan power in turn results in the development of a corresponding amount of noise which is perceived as being a nuisance for example in the fields of use such as vehicle heating, ventilation, air conditioning or like systems.

A filter device with a housing having a carrier providing a plurality of mutually adjacent layers fixed in a filter housing with an inlet and an outlet, with the layers being arranged in such a way that the gaseous medium flows along the layers as it passes through the housing is also to be found in GB-A-1 026 591. In that arrangement the carrier is wound on to a central bar or mandrel, thus affording mutually adjacent layers which form the round turns or windings of a spiral body. In that filter device the gaseous medium to be filtered thus does not flow through the carrier but along the turns or windings and the adsorber particles thereon, so that the flow resistance through the filter device is relatively low in comparison with filter devices in which the gaseous medium to be filtered is required to flow through the carrier. It has been found however that, when filter devices with a carrier wound in a spiral form of that kind are combined with fan devices, the vibration produced by the fan devices is picked up by the filter device and transmitted in unattenuated form or in an extreme situation even in an enhanced fashion, and that must be considered highly disadvantageous.

DE-A-43 39 025 discloses a method and an apparatus for cleaning polluted exhaust or waste air by means of heterogeneous catalysis. That apparatus can have a spiral winding comprising a non-metallic carrier material and an electrically conductive woven strip. That arrangement also provides for selective adsorption, besides a catalysis effect. In this case also however the spiral winding gives rise to the same problems, in regard to vibration and sound transmission, as in the case of the filter device disclosed in above-discussed GB-A-1 026 591.

SUMMARY OF THE INVENTION

An object of the present invention is to provide a filter device for a gaseous medium, in which the flow resistance through the filter device is reduced without the filter or adsorption action thereof being adversely affected thereby.

Another object of the present invention is to provide a filter device for a gaseous medium which while affording a satisfactory filter action by an adsorption effect is of a simple structure and is thus easy to manufacture.

In accordance with the principles of the present invention the foregoing and other objects are attained by a filter device for filtering a gaseous medium, comprising a filter housing having an inlet for the medium to be filtered and an outlet for the filtered medium. A flat carrier is disposed in the filter housing and constitutes a plurality of mutually adjacent carrier layers of a flat-surface configuration and assembled to form a stack of at least substantially rectangular parallelepipedic shape fixed in the filter housing. The carrier layers are disposed in relation to the inlet and the outlet of the filter housing in such a way that the gaseous medium to be filtered does not pass through the carrier layers but only flows along same. Adsorber particles of an elongate generally non-spherical shape are fixed to the carrier layers in an orientation which is at least approximately in the flow direction of the gaseous medium to be filtered as it passes through the filter housing from the inlet to the outlet thereof.

As will be seen in greater detail from the description hereinafter of a preferred embodiment of the filter device according to the present invention, the fact that the adsorber particles are of an elongate configuration differing from a spherical shape and are fixed to the carrier layers in such a way that they are oriented at least approximately in the flow direction of the gaseous medium affords a considerable reduction in the flow resistance through the filter device, without the filter and adsorber effect thereof being adversely affected.

The fact that the filter device involves a rectangular parallelepipedic shape also affords the advantage that it is possible to achieve sound-damping properties because vibration caused by sound, in the stack of carrier layers, is surprisingly attenuated and reduced in an optimum fashion.

In a preferred feature of the filter device according to the invention the layers may be mutually independent structures. As however the operation of assembling mutually independent layers of that kind to constitute the stack can involve a certain level of expenditure, it is also possible for the carrier of the filter device according to the invention to be folded together in closely adjacent relationship to form the individual layers in a stacked configuration. In the latter case therefore the individual layers do not form mutually independent structures, but rather the carrier is folded to constitute a plurality of layer portions which extend in closely adjacent relationship in the stack.

The arrangement of the layers within the filter housing is such that the gaseous medium to be filtered does not pass through the carrier as the gaseous medium flows from the inlet to the outlet, but the gaseous medium only flows along the layers of the carrier and thus along the adsorber particles which are fixed to the carrier layers, so that the flow resistance through the filter device is independent of any porosity of the carrier. In the extreme situation the carrier may even be gas-impermeable. That means however that virtually any material can be used for the carrier. For example, the carrier may be a fleece or non-woven fabric, a foil, a sheet, for example a textile material, a woven material, a knitted material, paper and so forth. It has been found that the pressure drop between the inlet and the outlet of the filter device according to the invention and therewith also the flow resistance through the filter device can be adjusted as desired by definedly compressing the carrier layers towards each other to a greater or lesser degree. At the same time the adsorption properties of the filter device according to the invention can be adjusted as desired by virtue of the carrier layers being subjected to a given pressure effect in that way.

In accordance with another preferred feature of the invention the ratio of the width to the depth of the stack of the filter device according to the invention is of the order of magnitude of 1:1 or greater and the ratio of the height to the width of the stack is at least 1:1, while the inlet and the outlet are determined by the width and the height of the stack and the spacing between the inlet and the outlet of the filter housing is determined by the depth of the stack. Preferably the ratio of the height to the width of the stack is at least 2:1, which means that the inlet and the outlet are each of a rectangular configuration.

Preferably, the carrier layers which are disposed in mutually closely adjacent relationship and which bear adsorber particles are joined together to form the stack by means of a plastic material which forms at least a part of the filter housing. The material may be an injection-molding or extrusion material of any appropriate nature for joining the layers together to constitute an integral stack.

In a preferred feature of the filter device according to the invention the ratio of the thickness of the individual carrier layers to the linear dimension of the adsorber particle cross-section may be between about 1:1 and 1:10. For example the individual carrier layers may be of a thickness of the order of magnitude of 200 µm and the adsorber particles may have a linear dimension in terms of their cross-section of the order of magnitude of between 200 µm and 1400 µm. In that respect, the spacing between adjacent carrier layers is dependent not only on the thickness of the layers themselves and the size of the adsorber particles which are fixed to the layers at one or both sides, but also the structural depth of the filter device between the inlet and the outlet thereof. The greater that depth of the device is, the greater can be the spacing between the adjacent carrier layers without any fear of break-through or disruptive penetration thereof.

In this respect it has also been noted that the break-through or disruptive penetration properties of the filter device according to the invention are substantially improved in comparison with prior filter devices, that is to say, the risk of break-through or penetration is reduced.

So that the filter device according to the invention can be easily fitted without difficulty into a given filter space or compartment, it is desirable in accordance with a further feature of the invention if the filter housing has a yielding or flexible frame element on its outside. That frame element may be of a closed-cell foam material.

Further objects, features and advantages of the filter device according to the present invention will be apparent from the following description of a preferred embodiment thereof.

DESCRIPTION OF THE PREFERRED EMBODIMENT

Figure 1:
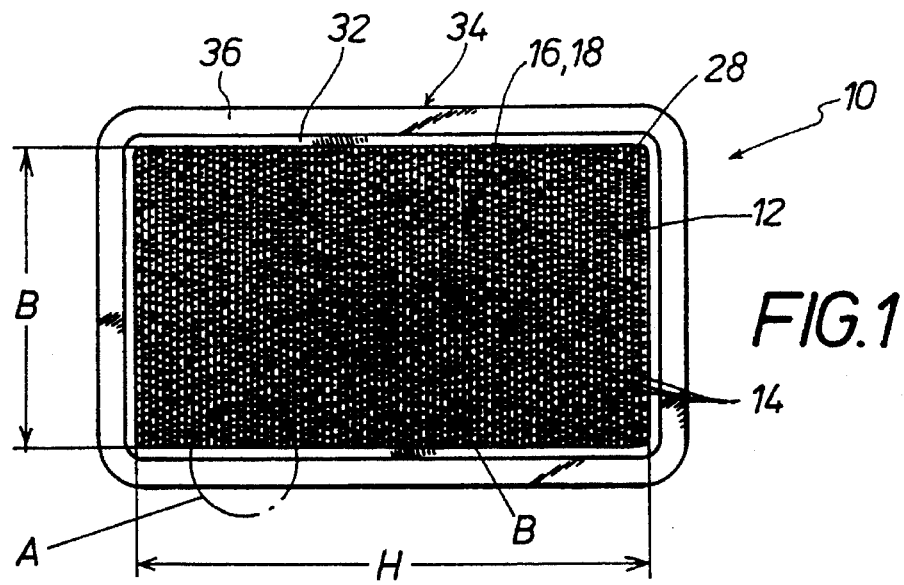
FIG. 1 is a front view of the filter device according to the invention.
Figure 2:
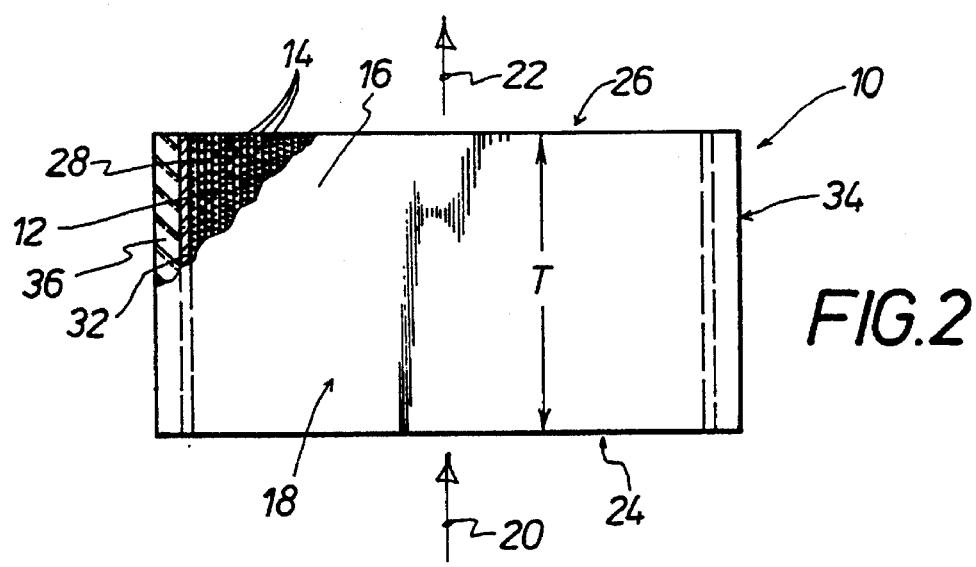
FIG. 2 is a partly cut-open view of the filter device shown in FIG. 1, viewing from above.

Referring firstly to FIGS. 1 and 2 of the accompanying drawing, they show a front view and a plan view of a filter device in accordance with the present invention as generally indicated by reference numeral 10. The filter device 10 has a flat or areal carrier 12 to which adsorber particles are fixed on both sides thereof. The carrier 12 comprises a plurality of mutually closely adjacent flat carrier layers 14 which constitute an at least substantially rectangular parallelepipedic shape as indicated at 16. In that assembly the individual carrier layers 14 may be mutually independent structures or layer portions, as can be seen from FIG. 3, or the carrier 12 can be closely folded together to afford the plurality of carrier layers 14 in a coherent or interconnected stacked relationship, as can be seen from FIG. 4. The carrier layers 14 thus form a rectangular parallelepipedic stack 18 which is of a width as indicated at B and a height as indicated at H in FIG. 1, and a depth as indicated at T in FIG. 2.

The rectangular parallelepipedic configuration of the stack 18 which is constituted by the carrier layers 14, and thus the generally rectangular parallelepipedic configuration of the filter device 10 generally, affords the advantage that vibrations caused by the medium to be filtered, in the filter device 10, are attenuated or removed in the optimum fashion.

Figure 3:
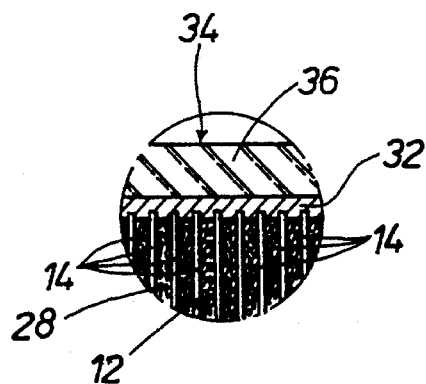
FIG. 3 is a view on an enlarged scale of the detail indicated at A in FIG. 1.
Figure 4:
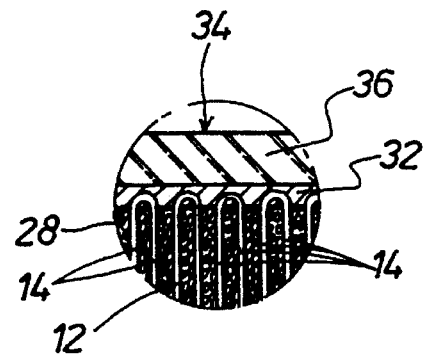
FIG. 4 is a view similar to that shown in FIG. 3 of the detail A of another configuration of the filter device.

The flow direction of a gaseous medium to be filtered by the filter device 10, in flowing through the filter device 10, is indicated in FIG. 2 by arrows 20 and 22. The arrow 20 is associated with the inlet as indicated at 24 in FIG. 2 of the filter device 10 while the arrow 22 is associated with the outlet 26 thereof. The gaseous medium to be filtered is thus introduced into the filter device 10 through the inlet 24 and then issues from the filter device 10 at the outlet 26. In flowing through the filter device 10 in that way, the gaseous medium to be filtered comes into contact with the carrier layers 14 which are disposed in closely juxtaposed relationship as shown in FIGS. 3 and 4 respectively and which form the stack 18, and more specifically with adsorber particles as diagrammatically indicated at 28, which are fixed on the carrier layers 14. Details of the adsorber particles 28 can be more clearly seen from FIGS. 5 and 6. As the gaseous medium to be filtered passes through the filter device 10, it does not penetrate or pass through the carrier layers 14 but only flows along the carrier layers 14 or the adsorber particles 28 on the carrier layers 14, as is indicated by the flow lines 30 in FIG. 6.

The carrier layers 14 which are stacked together in closely adjacent relationship and which bear the adsorber particles 28 thereon are joined together to form the stack 18 by means of a suitable plastic material 32. The plastic material 32 forms at least a part of a filter housing 34 by which the inlet and outlet 24 and 26 respectively of the filter device 10 are defined. The filter housing 34 is desirably provided on its outside with a yielding or flexible frame element 36 whereby it is possible for the filter device 10 to be easily fitted into a suitable filter space or chamber.

Figure 5:
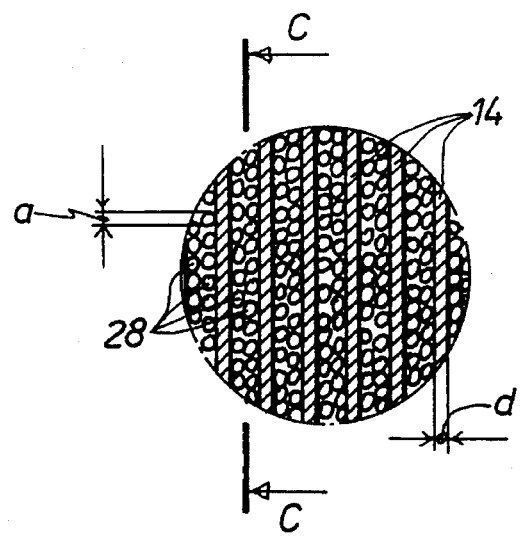
FIG. 5 is a view on a further enlarged scale of the detail indicated at B in FIG. 1.
Figure 6:
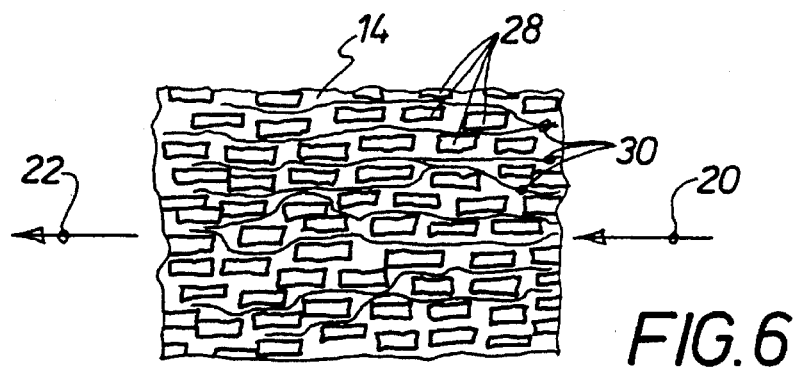
FIG. 6 is a view in section taken along section line C-C in FIG. 5 to show a surface portion of a carrier layer provided with adsorber particles of an elongate configuration.

In FIG. 5 the thickness of a carrier layer 14 is identified by d and the linear dimension of the adsorber particle cross-section is identified by a. The thickness d of each of the carrier layers 14 may be for example of the order of magnitude of 200 µm. The linear dimension a of the adsorber particles 28 can be for example in the range between 200 µm and 1.4 mm or more. The adsorber particles 28 may be at least approximately spherical or preferably may be of an elongate configuration which differs from the spherical shape. FIG. 6 clearly shows elongate adsorber particles 28 of that kind which differ from a spherical shape and which, in order to reduce the flow resistance afforded to the gaseous medium to be filtered as it passes through the filter housing 34, are desirably fixed to the carrier layers 14 in such a way that they are oriented at least approximately parallel to the flow direction of the gaseous medium to be filtered, as indicated by the arrows 20 and 22. That orientation can be achieved for example by fixing the adsorber particles 28 to the carrier layers 14 in an electrostatic field. Other suitable ways of providing for the appropriate orientation of the adsorber particles may be employed.

It will be noted in this respect that the same features and details are identified in each of FIGS. 1 through 6 by the same references so that there is no need at this point for all the details of all the Figures to be more fully described here.

Figure 7:
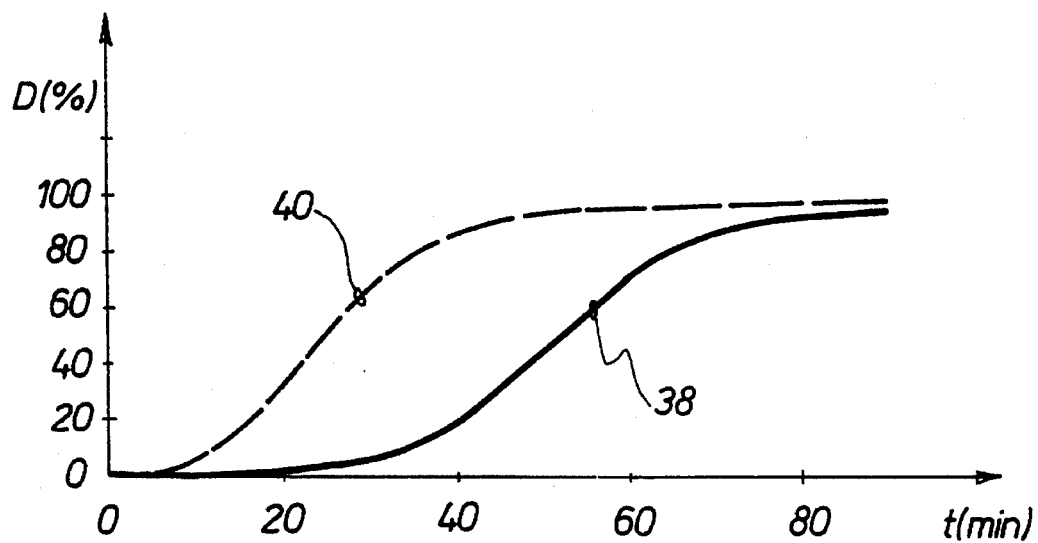
FIG. 7 is a graph showing the break-through characteristics of a filter device of rectangular parallelepipedic shape according to the invention in comparison with a prior filter device in which the gaseous medium to be filtered flows through the porous flat carrier.

FIG. 7 shows a graph illustrating the dependency of the break-through or penetration D in % of a filter device according to the invention as indicated by the line 38, in comparison with the break-through characteristic of a prior filter device with the same test parameters, in dependence on time t, the characteristic of the prior filter device being indicated by the broken line 40. It will be readily apparent from FIG. 7 that the break-through characteristic of the filter device according to the invention is considerably improved. Thus, when testing a practical configuration of the filter device 10 according to the invention, the N-butane break-through after 15 minutes is for example only 0.45% while in the case of a prior filter device, with the test parameters being otherwise at least approximately the same, the percentage value is 16.3%.

It has been found that the filter device according to the invention provides for a reduction in flow resistance to the flow of gaseous medium therethrough, without thereby adversely affecting the filter or adsorption effect which involves pollutant adsorption on the adsorber particles.

It will be appreciated that the above-described filter device according to the invention has been set forth only by way of example and illustration of the principles of the invention and that various modifications and alterations may be made therein without thereby departing from the spirit and scope of the invention. For example, adsorber particles may be fixed to the carrier layers 14 at just one side thereof.

What is claimed is:

1. A filter device comprising: a filter housing having an inlet for a gaseous medium to be filtered and an outlet for the filtered gaseous medium; a flat carrier in the filter housing and constituting a plurality of mutually adjacent carrier layers of a flat-surfaced configuration and assembled to form a stack of at least substantially rectangular parallelepipedic shape fixed in the filter housing, the carrier layers being disposed in relation to the inlet and the outlet of the filter housing in such a way that the gaseous medium to be filtered does not pass through the carrier layers but only flows along the carrier layers; and adsorber particles of an elongate configuration differing from a spherical shape and fixed to the carrier layers in an orientation at least approximately in the flow direction of the gaseous medium to be filtered.

2. A filter device as set forth in claim 1 wherein the carrier layers are mutually independent structures.

3. A filter device as set forth in claim 1 wherein the carrier is closely folded together to constitute the carrier layers in a close stacked relationship.

4. A filter device as set forth in claim 1 wherein the ratio of the width of the stack to the depth of the stack is at least of the order of magnitude of 1:1 and the ratio of the height of the stack to the width of the stack is at least 1:1 and wherein the inlet and the outlet of the filter housing are determined by said width and said height and the spacing between the inlet and the outlet is determined by the depth of the stack.

5. A filter device as set forth in claim 1 wherein at least a part of the filter housing is formed by a plastic material which joins the carrier layers together to form said stack.

6. A filter device as set forth in claim 1 wherein the ratio of the thickness of the individual carrier layers to the linear dimension of the adsorber particle cross-section is between 1:1 and 1:10.

7. A filter device as set forth in claim 1 including a flexible frame element on the outside of the filter housing.

8. A filter device for a gaseous medium, comprising: a filter housing having inlet means for the gaseous medium to be filtered and outlet means for the filtered gaseous medium; carrier means in the housing adapted to form a plurality of mutually adjacent layer portions each of a substantially flat-surfaced elongate configuration and assembled to form a stack of at least substantially rectangular parallelepipedic shape in the filter housing, the direction of elongation of the layer portions extending in the direction of flow of the gaseous medium from the inlet means through the filter housing to the outlet means whereby in operation of the filter device the gaseous medium flows along the layer portions; and adsorber particles of a configuration such that a first dimension thereof is longer than a second dimension which is perpendicular to said first dimension, the adsorber particles being fixed to the layer portions with said first dimension oriented at least approximately parallel to the direction of flow of the gaseous medium from the inlet means through the filter housing to the outlet means.

* * * * *